No. 625,401. Patented May 23, 1899.
A. P. LANTERMAN.
DENTAL TOOL.
(Application filed Aug. 8, 1898.)
(No Model.)

WITNESSES:
Wm. J. Brauitzky
Alfred Meltzer

INVENTOR
Alvan P. Lanterman
BY
Wm. R. Rummler
his ATTORNEY.

UNITED STATES PATENT OFFICE.

ALVAN P. LANTERMAN, OF CHICAGO, ILLINOIS.

DENTAL TOOL.

SPECIFICATION forming part of Letters Patent No. 625,401, dated May 23, 1899.

Application filed August 8, 1898. Serial No. 688,025. (No model.)

*To all whom it may concern:*

Be it known that I, ALVAN P. LANTERMAN, a citizen of the United States, residing at Chicago, in the county of Cook and State of Illinois, have invented a new and useful Improvement in Dental Tools, of which the following is a specification.

My invention relates to dental tools, and particularly to tools for slitting and removing cap-crowns from teeth. Its main objects are, first, to provide a dental tool with which the tooth-engaging flange or band of the cap-crown can be slitted at a part where same will not show from the outside after the flange has been soldered together and replaced, and, second, to provide for adjusting the cutting member of the tool, so that the flange can be conveniently slitted at any part of its circumference, so as to enable the operator to slit the flange either in the rear, in the front, or at the side, as the case may require.

The further objects of the particular features of construction shown will be understood from the following description with reference to the accompanying drawings, in which—

Figure 1:
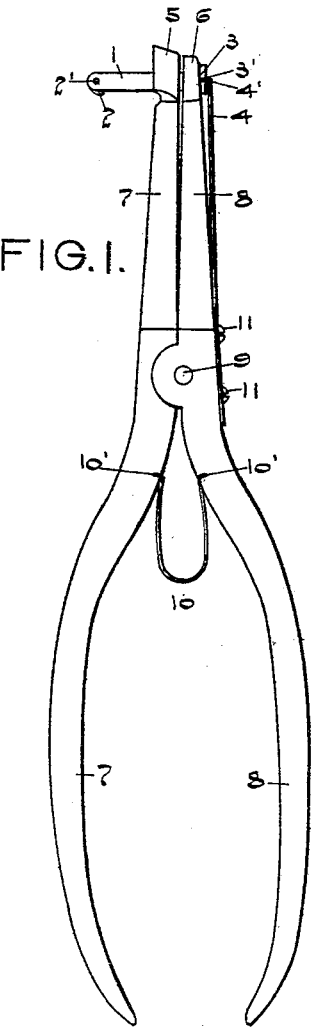
Figure 2:
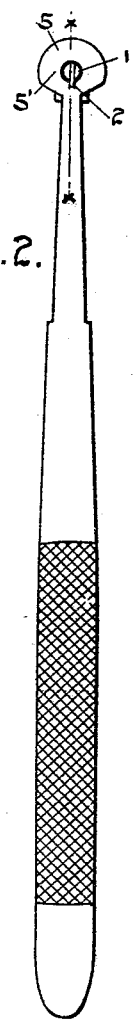
Figure 3:
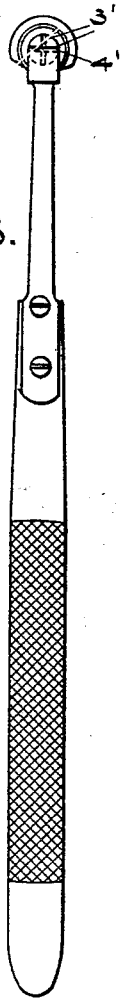
Figure 4:
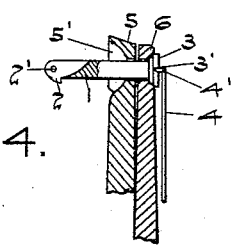

Figure 1 is a side elevation of a tool constructed according to my invention. Fig. 2 is a front elevation, and Fig. 3 is a rear elevation, of same. Fig. 4 is a vertical section on the line $x\ x$ of Fig. 3, partly broken away.

The device shown in the drawings consists of shanks 7 and 8, pivoted together at 9 and having handles 7' and 8', normally urged apart by the spring 10, which is seated in sockets 10' in the handles. The shank 7 has thereon the bearing-jaw 5 for contact with the coronal or cusped surface of a cap-crown, having its bearing-surface 5' slightly concave, so as to provide for firmly engaging said cusped surface. The shank 8 supports the bar 1, having the cutting edge 2 thereon. The bar 1 forms an extension of the shank 8 and passes through an orifice in the jaw 5 and enlarged end 6 of the shank 8. The blade 2 is seated in a slot therefor in the free end of the pin 1 and rigidly held by the rivet 2' and may be replaced by another blade when its cutting edge becomes dull. The pin 1 has a head 3 thereon at the rear of the shank 8 with outer slots 3' therein. The slots 3' cross each other. The spring 4 has its end bent over to form a tooth for engaging one of the slots 3'. The spring 4 is fastened to the arm 8 by the screws 11.

In operating the device the bar 1 is first adjusted so that the blade 2 will face in the desired direction. This is done by raising the spring 4 and turning the bar 1 so that the blade faces in the desired direction and then releasing the spring 4, so that its tooth 4' will be seated in one of the grooves 3'. Only two grooves 3' at right angles to each other are shown in the drawings; but it is plain that several more grooves may be made, crossing at different angles, if desired.

In the drawings the tool is adjusted for cutting the tooth-engaging flange of the cap-crown at the rear of the tooth. The operator inserts the tool with the bearing-surface adjacent the shank 7 resting upon the inner edge of the coronal or cusped surface of the cap-crown to be removed. The cutting edge 2 will then be against the tooth-engaging flange of the cap-crown at the part of the flange toward the rear of the tooth. The operator then presses the handles 7' and 8' toward each other. This serves to separate the shanks 7 and 8 and draws the cutting edge through the flange, slitting same toward the bearing-surface 5'. The operation of slitting the flange is the same regardless of the position to which the cutting-blade 2 is adjusted by turning its supporting-pin 1. For cutting the flange at the front of the tooth the pin 1 would be adjusted so as to face upwardly in Fig. 1. The upper end of the bearing-surface would then be brought in contact with the coronal or cusped surface of the cap-crown. For cutting the flange at the side of a tooth instead of the front or back the pin 1 is adjusted so as to cause the blade 2 to project at right angles to its position as shown in Fig. 1. In all of these operations the body of the tool can be held in substantially the same direction by the operator, it being necessary only to change the direction of the blade 2 for slitting the tooth-engaging flange of the cap-crown at different places in its circumference.

It will be seen that my general construction can be used for scraping or performing other operations upon the back or sides of a tooth by substituting another suitable tool point or end for the blade 2.

It is plain that the details of construction may be altered in numerous ways without departing from the spirit of my invention. I do not therefore confine myself to such details.

I am aware that it is old to provide a tool for the same purpose with a pair of coacting jaws in which one jaw has a bearing-surface for the cusped surface of a crown and the other is made shorter, has its shank in front of said bearing-surface, and has a cutting edge thereon which is arranged to cut the tooth-engaging flange of a cap-crown in front or toward the handle of the tool. I therefore do not claim such construction broadly.

What I do claim as my invention, and desire to secure by Letters Patent, is—

1. A dental tool for slitting cap-crowns, comprising a handle; a pair of coacting lever-jaws thereon, one of same having a bearing-surface for the coronal or cusped surface of the cap-crown, and the other jaw having a cutting member thereon, adjustable into different radial planes, with reference to the handle; whereby the handle can be held in substantially the same direction, for slitting the tooth-engaging flange of the cap-crown at different parts of its circumference, substantially as described.

2. A dental tool for slitting cap-crowns, comprising a pair of coacting lever-jaws, one of the same having a bearing-surface for the coronal or cusped surface of the cap-crown, and the other jaw having a shank located behind said bearing-surface, with an extension having a cutting edge thereon in front of said bearing-surface adjustable to positions opposite different parts of the bearing-surface, substantially as described.

3. A dental tool for slitting cap-crowns, comprising a pair of coacting jaws, one of same having a bearing-surface for the coronal or cusped surface of the cap-crown, with an orifice through said bearing-surface, and the other jaw having a shank located behind said bearing-surface, and having a pivotally-adjustable extension passing through said orifice, with a cutting edge thereon in front of said bearing-surface and adapted to cut toward said bearing-surface, substantially as described.

4. A dental tool for slitting cap-crowns, comprising a pair of coacting lever-jaws, one of same having a bearing-surface for the coronal or cusped surface of the cap-crown, and the other jaw having a shank located behind said bearing-surface, with an extension having a cutting edge thereon in front of said bearing-surface, adapted to cut toward said bearing-surface, substantially as described.

5. A dental tool comprising a pair of coacting lever-jaws, one of the same having a bearing-surface for the coronal or cusped surface of a tooth, and the other jaw having a shank located behind said bearing-surface, with an extension having a tool point or end located in front of said bearing-surface, substantially as described.

6. A dental tool comprising a pair of coacting lever-jaws, one of same having a bearing-surface for the coronal or cusped surface of a tooth, and the other jaw having a shank located behind said bearing-surface, with an extension having a tool point or end located in front of said bearing-surface, adjustable to positions opposite different parts of the bearing-surface, substantially as described.

7. A dental tool comprising a pair of coacting jaws, one of the same having a bearing-surface for the coronal or cusped surface of a tooth, with an orifice through said bearing-surface, and the other jaw having a shank located behind said bearing-surface, and having a pivotally-adjustable extension passing through said orifice, with a tool point or end thereon in front of said bearing-surface, substantially as described.

8. A dental tool, comprising a handle; a pair of coacting lever-jaws thereon, one of same having a bearing-surface for the coronal or cusped surface of a tooth, and the other jaw having a tool point or end thereon, adjustable into different radial planes with reference to the handle; whereby the handle can be held in substantially the same direction for operating said tool point or end at different parts of the circumference of the tooth, substantially as described.

Signed by me, at Chicago, this 2d day of August, 1898.

ALVAN P. LANTERMAN.

Witnesses:
WM. R. RUMMLER,
ALFRED MELTZER.